United States Patent [19]

Kahan et al.

[11] Patent Number: 4,848,881
[45] Date of Patent: Jul. 18, 1989

[54] VARIABLE LENS AND BIREFRINGENCE COMPENSATOR

[75] Inventors: Osher Kahan, Culver City; Eduard Gregor, Pacific Palisades, both of Calif.

[73] Assignee: Hughes Aircraft Company, Los Angeles, Calif.

[21] Appl. No.: 11,393

[22] Filed: Feb. 4, 1987

Related U.S. Application Data

[63] Continuation of Ser. No. 677,452, Dec. 3, 1984, abandoned.

[51] Int. Cl.$^4$ ............................ G02F 1/19; H01S 3/00
[52] U.S. Cl. ...................................... 350/400; 307/353; 307/358; 350/353; 350/405; 372/105
[58] Field of Search ............... 350/253, 353, 400, 351, 350/405, 387, 393, 356; 372/29, 31, 33, 34, 97–98, 101, 105; 307/353, 358; 328/117, 151; 219/121 LP, 121 LQ, 121 LR, 121 LU, 121 LZ

[56] References Cited

U.S. PATENT DOCUMENTS

| | | | |
|---|---|---|---|
| 3,305,786 | 2/1967 | Smith | 328/151 |
| 3,434,779 | 3/1969 | Damen et al. | 350/353 |
| 3,442,574 | 5/1969 | Marcatili et al. | 350/179 |
| 3,532,891 | 10/1970 | Simmons et al. | 350/387 |
| 3,541,300 | 11/1970 | Stadnik et al. | 219/210 |
| 3,577,098 | 5/1971 | Winston | 372/98 |
| 3,609,584 | 9/1971 | Stitch et al. | 350/353 |
| 3,662,281 | 5/1972 | Koechner | 331/94.5 |
| 3,704,935 | 12/1972 | Boer | 350/160 |
| 3,705,758 | 12/1972 | Haskal | 350/356 |
| 3,736,046 | 5/1973 | Zook | 350/379 |
| 3,761,185 | 9/1973 | Blackwell | 328/151 |
| 3,780,296 | 12/1973 | Waksberg et al. | 250/201 |
| 3,790,250 | 2/1974 | Mitchell et al. | 350/353 |
| 3,838,906 | 10/1974 | Kumada | 350/388 |
| 3,892,469 | 7/1975 | Lotspeich | 350/379 |
| 3,945,715 | 3/1976 | Drake | 350/389 |
| 3,953,803 | 4/1976 | Gallant | 307/234 |
| 4,019,159 | 4/1977 | Hon et al. | 372/29 |
| 4,117,399 | 9/1978 | Ono et al. | 324/96 |
| 4,124,273 | 11/1978 | Huignard et al. | 350/379 |
| 4,169,661 | 10/1979 | Yamada et al. | 350/353 |
| 4,295,099 | 10/1981 | Evans | 307/351 |

FOREIGN PATENT DOCUMENTS

| | | | |
|---|---|---|---|
| 7533563 | 12/1975 | France. | |
| 2292353 | 6/1976 | France. | |
| 191019 | 10/1984 | Japan | 350/353 |
| 193431 | 11/1984 | Japan | 350/353 |

OTHER PUBLICATIONS

Gleason et al., "Thermally Induced Focusing in a Nd:Yag Laser Rod at Low Input Powers", App. Optics, 12-1973, pp. 2942-2946.

Koechner, W., "Thermal Lensing in a Nd;Yag Laser Rod", Appl. Optics, 11-1970, pp. 2548-2553.

*Primary Examiner*—John K. Corbin
*Assistant Examiner*—Martin Lerner
*Attorney, Agent, or Firm*—William J. Streeter; A. W. Karambelas

[57] ABSTRACT

Apparatus and method are disclosed for providing a variable lens and birefringence compensator (10) adapted to be used within the resonator cavity of a repetitively pulsed, variable rate, solid state laser. A cylindrical body of optical material (12) having a temperature dependent index of refraction is thermally coupled to heat exchange means (14) surrounded by potting material (16) and a heat sink (18) which adds heat to or extracts heat from the exterior surface of the cylindrical body in order to establish radially dependent thermal and stress gradients within the body. The heat exchange means is supplied power through leads (20) from the same source (22) which excites the excitation mechanism of the solid state laser. Heat is infused into or extracted from the compensator body at the same rate at which the flashtube stimulates the laser rod (24) within the laser cavity defined by resonator mirrors (26, 28). The thermal gradient is used to create a dynamic lens of opposite power to that of the laser rod which corrects beam divergence in the lased output. The stress gradient causes the compensator body to behave like a birefringent substance. The double refracting behavior of the compensator effectively reconstructs the laser beam which passes through it which was depolarized by the birefringent action of the laser rod itself.

1 Claim, 5 Drawing Sheets

VARIABLE LENS AND BIREFRINGENCE COMPENSATOR

This is a continuation of co-pending application Ser. No. 06/677,452 filed on Dec. 3, 1984, now abandoned.

BACKGROUND OF THE INVENTION

1. Field of the Invention

The present invention relates to lasers and optical compensation of laser radiation. More specifically, this invention is concerned with means and methods for creating a temperature gradient within a body of optical material for establishing radially dependent optical path length and polarization fields which can be exploited to compensate for anomalies in laser rods.

2. Background Information

Figure 3A:
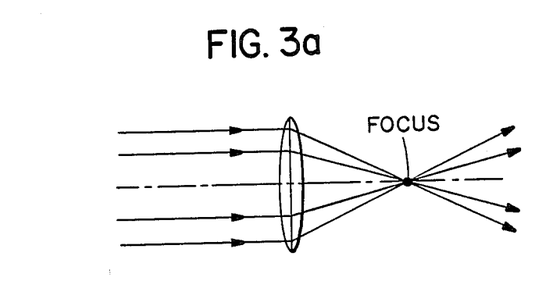
FIGS. 3a, b, and 3c-3g are illustrative explanations of the action of a positive lens, a negative lens, and the property of birefringence respectively.

One of the most burdensome problems which confronts designers of communication and measuring systems which employ lasers is the phenomenon of beam divergence. Although lasers produce coherent light which is commonly perceived to be constituted of a multitude of perfectly parallel rays of electromagnetic radiation, these rays always spread to some extent. Excessive divergence of the beam occurs if the optical components comprising the resonator cause optical distortions. Various laser amplification media and systemic constraints cause distortion in laser rods. Typical repetitively pumped solid state laser rods, for example, tend to produce output radiation which diverges in proportion to the pumping power of the laser. An optical device which causes radiation to diverge exhibits the most significant property of a convex or positive lens, as depicted in FIG. 3a.

If an incident beam of light composed of collimated or parallel rays is directed toward a positive lens of uniform and isotropic temperature and is aligned parallel to the optical axis of the lens, then the direction of each ray that issues from the exit side of the lens will depend upon the angle of its incidence relative to the surface normal on the face of the lens and upon the optical path length which the ray must traverse in order to travel across the lens. Each ray will be bent by an amount which is dependent upon its angle of incidence relative to the surface normal and its path length which, in turn, depends upon the index of refraction of the optical material from which the lens is made and the thickness of the lens which the ray traverses.

In the case of a repetitively pumped laser rod, the rod will be heated by an amount proportional to the input power the rod absorbs from the excitation mechanism. The heat in the rod is dissipated at its exterior surface. Gradually, perhaps over a period of ten seconds, the rod is transformed into a positive lens by this heating and cooling. This transformation takes place because the rod is not uniformly and isotropically homogeneous with respect to temperature. The temperature differences along any radius of the rod set up regions of different indices of refraction. A radial temperature gradient is created within the rod, and, since the refractive index is temperature dependent, a radial refractive index gradient is also established within the rod. This effectively creates a lens having a distribution of radially dependent optical path lengths which mimics that of a physically convex lens which is depicted in FIG. 3a. The power of this transitory positive lens is proportional to the extent to which it is heated because the temperature determines the spatial variation of refraction within it. The temperature gradient generated in the rod is proportional to the heat flow and the refractive index parallels the temperature gradient. This dynamic lensing action of the rod, brought about by a temperature gradient, is responsible for the unwanted beam divergence.

When the output beam of a laser diverges in this way, the coherent radiation loses much of its effectiveness, since the energy delivered by the beam to a distant point depends on how much of the beam is concentrated on a targeted spot of limited area. Energy which is spread out over a much larger area than the cross-section of the original beam is less concentrated, and therefore less useful, in communications and measurement applications.

Various complex mechanical systems have been employed to in previous attempts to solve this problem of rod lensing. One such system is a zoom lens which consists of a pair of short focal length lenses of opposite optical power. The spacing between the lenses can be adjusted to control the net optical power resulting from the use of the pair of lenses. This arrangement maintains a constant beam divergence, but the exorbitant cost of the necessary precision lenses, mechanical races, direct current motor, and complicated control electronics makes this solution unattractive.

Simple static concave negative lenses have been used in the laser resonator cavity to compensate for the dynamic lensing action of the rod. The constant action of the static negative lens, however, proves detrimental to the operation of the laser until the time when the laser rod has been heated and has attained the exactly equivalent but opposite optical power for which the simple fixed negative lens is designed to compensate. A further complication results from the use of variable repetition rates of the pulsed laser. One static concave negative lens can not cope with variable rates, since the best achievable compensation is for one particular, specified magnitude or extent of dynamic lensing caused by the heated laser rod.

Another problem concerning the performance of a solid state laser is the optical aberration of laser rod due to thermal birefringence in the laser rod which causes depolarization of the laser beam and reduces efficiency in polarized lasers. When a solid state rod is pumped with excitation radiation, a great portion of this stimulation energy is converted to heat in the rod. One of the effects of this rod heating is the depolarization of the laser beam by birefringence. Beam depolarization can reduce the potency of laser output and therefore poses a serious problem when lasers are used in situations which require high power output.

In a solid state rod, heat resulting from flashlamp excitation causes physical deformation of the rod. Since the rod material expands with temperature, a radial stress gradient is formed which produces radially dependent birefringence in the rod. Birefringence, also known as double refraction, is an optical phenomenon in which a material exhibits a different index of refraction for each of two polarization directions defined by the material. This double refraction is illustrated by the action of a birefringent crystal in FIGS. 3c–3g. In the course of the passage of light through birefringent medium resolves the polarized beam into two component beams. Each beam is polarized along one of the unique directions, so that the beams traverse the material at different speeds. When the two beams recombine after leaving the material, they are no longer in phase with one another and the polarization state is changed.

Figure 3B:
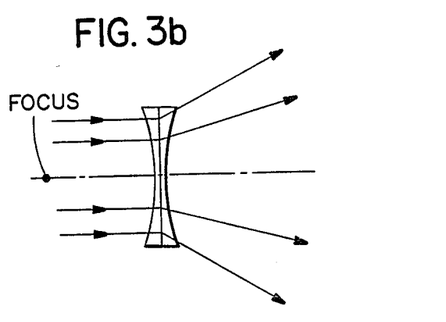
Figure 3C:
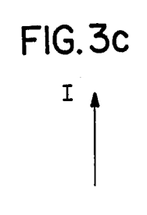
Figure 3D:
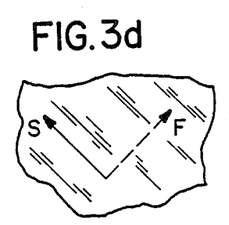
Figure 3E:
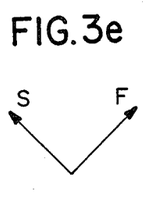
Figure 3F:
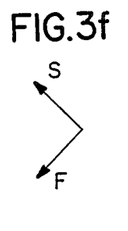
Figure 3G:
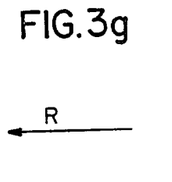

FIGS. 3c–g schematically illustrate this birefringence phenomenon. In FIG. 3c, vector I represents the polarization direction of a beam of incident light. When this beam I passes through a birefringent material, as is shown in cross-section in FIG. 3d, the vector I is resolved into two components travelling at different speeds, S, shown in solid line, and F, shown in dashed line. Components S and F, which represent high and low refractive index polarizations, respectively, are shown after exiting the crystal in FIG. 3e. The S component now lags the F component as a result of the birefringent action (FIG. 3f). When added vectorially, S and F combine to form the resultant vector R which has a new polarization direction (as shown in FIG. 3g).

The heat in the laser rod creates depolarizing regions within it which vary in efficacy in accordance with each internal region's distance from the central axis of the rod. The different regions cause the rod as a whole to become birefringent because of variations in the indices of refraction of the differently stressed portions of the rod. As was the case with the limitations of compensation of beam divergence by the action of a single, simple negative lens placed within the resonator cavity, such a lone optical element is equally ineffective in correcting for depolarization caused by laser rod thermal stress birefringence.

Previously known methods of compensating for rod birefringence include the use of a polarization rotator used between a pair of rods operated at the same output power level. A lensing system is employed to align the beam so that the rods compensate for each other's birefringence. This system, however, requires the use of two rods in addition to pressure vessels which are extremely expensive and difficult to maintain in proper mechanical alignment.

A number of inventions noted in the disclosure statement filed in connection with this application employ devices which modify a beam of radiation using an externally controlled optical medium in order to alter various properties of the beam. U.S. Pat. No. 3,736,046—Zook, discloses apparatus which adjusts the wavefront shape of a light beam using beam-addressed optical memory means controlled by a varying electric field. Mitchell et al. describe an optical device which exhibits temperature-dependent optical absorption properties in U.S. Pat. No. 3,790,250. An apparatus devised by Drake in U.S. Pat. No. 3,945,715 employs an electro-optical transducer in a large scale data storage system. Hon et al. (U.S. Pat. No. 4,019,159) use a feedback arrangement with a crystal of electro-optic material mounted in an oven to control the temperature and tune the electric field of a frequency doubling crystal. In U.S. Pat. No. 4,117,399, Ono et al. explain a method and apparatus for measuring electric current or voltage which utilizes an optical converter which includes a source of laser light, a polarizer, and a Faraday rotator. Huignard et al. exploit the Kerr Effect by subjecting two astigmatic electro-optical elements to varying electric fields in U.S. Pat. No. 4,124,273 in order to focus an incident beam of energy on an object which is changing its position rapidly. A thermal-optical converter comprising a closed vessel containing an aqueous solution is disclosed by Yamada et al., in U.S. Pat. No. 4,169,661.

None of the preceding inventions solve the problem of the deleterious effects of beam divergence or depolarization produced by thermally induced birefringence in a solid state rod laser. Three of the inventions cited in the disclosure statement are more directly concerned with the problem of using an externally controlled optical medium to accomplish some compensation of aberrations in a beam of radiation. Kumada discloses apparatus comprising an electro-optical crystal used in conjunction with a power source which is used to impose a voltage that regulates the transmission of incident light through the crystal. This optical switch, which is described in U.S. Pat. No. 3,838,906, restricts light transmission by altering the birefringent characteristics of the crystal. Kumada's invention is not directed to the problem of mitigating beam divergence or correcting unwanted depolarization in coherent light output. In U.S. Pat. No. 3,780,296, Waksberg, et al., disclose apparatus for an electro-optical laser beam modulation system. This device requires a specially birefringent optical medium and employs analyzer and photodetector means for generating and processing an error signal in order to modify the characteristics of a laser beam. This device not only requires a medium which must exhibit particular birefringent behavior, but also necessitates the inclusion of complex electronic control and analysis equipment. U.S. Pat. No. 3,892,469—Lotspeich reveals an apparatus which employs an array of cylindrical electrodes which are embedded in a solid body of crystalline material and are energized by a remote power supply in order to provide a device having a variable focal length. Lotspeich's device requires the precise and costly implantation of metal electrodes in a specialized compensation medium. Additionally, Lotspeich makes no attempt to confront the difficulties imposed by stress-related depolarization of the beam.

None of these prior devices provides an effective and inexpensive solution to the optical aberrations described above in detail which plague the operation and performance of high-onput solid-state lasers. Such a solution would satisfy a long felt need manifested by the current efforts of the laser and optics industry which continues to develop communications and measurement systems which require reliable, durable, and cost-effective high-output lasers. The continued development and manufacture of such high-power lasers has generated a concomitant demand for an invention which compensates for laser beam imperfections in a manner which does not create additional deleterious side-effects and which does not interfere with the performance and amplification of the laser itself.

Such a compensator would ideally be suited to operate inside a repetitively pumped laser resonator and would be required to function effectively over all repetition rates and over a wide range of temperatures which would include operational ranges for military as well as commercial applications.

SUMMARY OF THE INVENTION

The present invention provides an efficacious, practical, cost-effective, and straightforward solution to the problems of beam divergence and birefringent depolarization. The present invention utilizes a compensator comprised of a body of optical material which is thermally coupled to heat transfer means for establishing an adjustable radial temperature gradient within the compensator. The compensator body is designed to reside within a laser resonator on either side of the laser rod without adversely affecting the laser tuning, although the invention could be adapted to operate outside of the laser cavity without a loss of performance. Heat is added to or extracted from the periphery of the compensator body in exact proportion to the extent of the heating of the laser rod. By coupling a heat transfer means to the power source which feeds the excitation means of the laser rod, a closed loop operation can be achieved. The device is equally capable of functioning in an open loop configuration.

The addition or extraction of heat from the compensator body establishes a radial thermal gradient within it which is opposite to the gradient in the laser rod. In the laser rod, heat is dissipated at its periphery. In the compensator, heat will usually be added at the periphery of the compensator. By selecting a material for the compensator body which has a temperature dependent index of refraction, the spatial variation of temperature within the body can be exploited to create a dynamic lens. By further selecting a material which develops a higher index of refraction when its temperature is increased, the compensator can be made to behave like a negative lens such as illustrated in FIG. 3b, when the heat transfer means is activated and raises the temperature of the compensator body. By placing such a compensator in proper alignment with the divergent output of a solid state laser rod, beam divergence can be reduced since the positive aspect of the laser rod will be canceled by the exactly opposite negative aspect of the dynamic lens formed by the compensator. Furthermore, depolarization caused by laser rod birefringence can be similarly remedied since the thermal gradient within the dynamic lens is deliberately imposed to be in the opposite sense of the gradient within the laser rod. By selecting optical material which possesses a particular refractive index dependence upon temperature, this single device can simply and inexpensively extinguish a substantial portion of both sources of optical imperfection concurrently.

The present invention further solves the dilemma which results from the use of a single simple negative lens within the resonator cavity. Since the compensator's heat means is linked to the flash tube or other excitation mechanism of the laser, the action of the compensator is always directly proportional and opposite to that of the stimulated laser rod. The compensator is initially optically neutral. The optical power it subsequently assumes during each repetition cycle is automatically tailored to the laser rod. The lensing phenomenon produced by the present invention will always be precisely suited to accomplish a correction of divergence or birefringence aberrations which would otherwise distort the laser output.

It is, therefore, an object of the present invention to provide an effective means of correcting the problem of thermally induced excess beam divergence in solid state rod lasers.

It is a further object of the invention to correct unwanted depolarization of laser beams caused by laser rod birefringence.

Yet another object of the invention is to accomplish these corrections over a wide spectrum of laser pulse rate frequencies and temperatures.

It is a further object of the invention to effectively diminish the above described optical aberrations in an inexpensive and reliable manner which employs a minimum of parts. Such avoidance of moving parts eliminates the constant calibration and eventual replacement of components which are susceptible to wear by friction.

Another object of the invention is to provide a compensator which is sufficiently versatile so that it will function when deployed on either side of the laser rod or even immediately outside the resonator.

An appreciation of other aims and objects along with a more complete and comprehensive understanding of the present invention may be achieved through the study of the following description of a preferred embodiment in addition to reference to the accompanying drawings.

DESCRIPTION OF A PREFERRED EMBODIMENT

Figure 1:
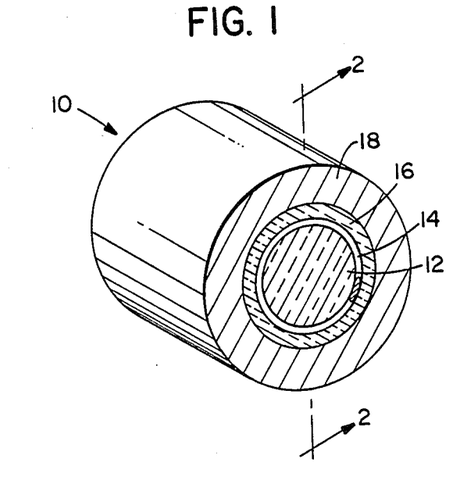
FIG. 1 is a perspective view of the present invention which also reveals its cross-sectional structure.

Referring to FIG. 1, a variable lens and birefringence compensator 10 includes a cylindrical body 12 of optical material surrounded by heat exchange means 14 consisting of a coil of thin insulated wire which is wound around the full extent of body 12. The heat exchange means 14 is, in turn, enveloped by a layer of potting material 16 which has the property of being a poor thermal conductor. This insulating layer is disposed between the body 12 of optical material and a heat sink 18 which is employed to dissipate excess heat which builds up in the body 12.

Figure 2:
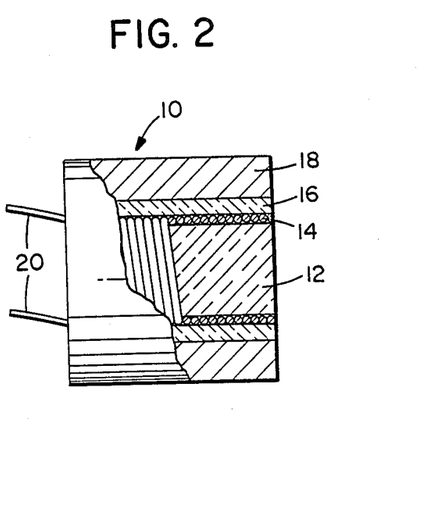
FIG. 2 is an elevational, partial cut-away view of the invention taken along line 2—2 of FIG. 1.
Figure 4:
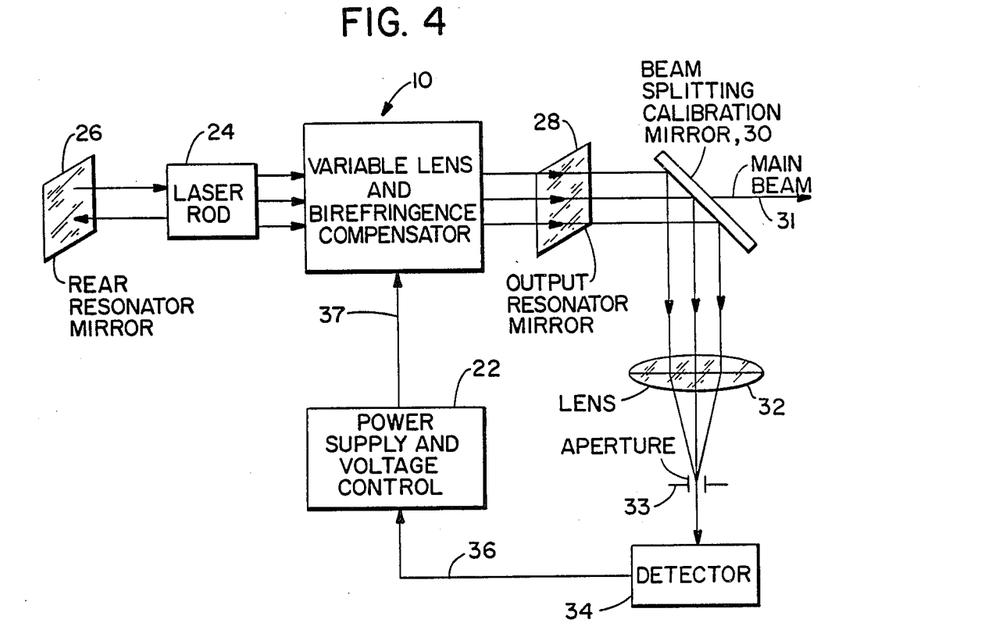
FIG. 4 is a schematic representation of the present invention shown together with a laser, resonator means, and equipment for calibrating the compensator.
Figure 5:
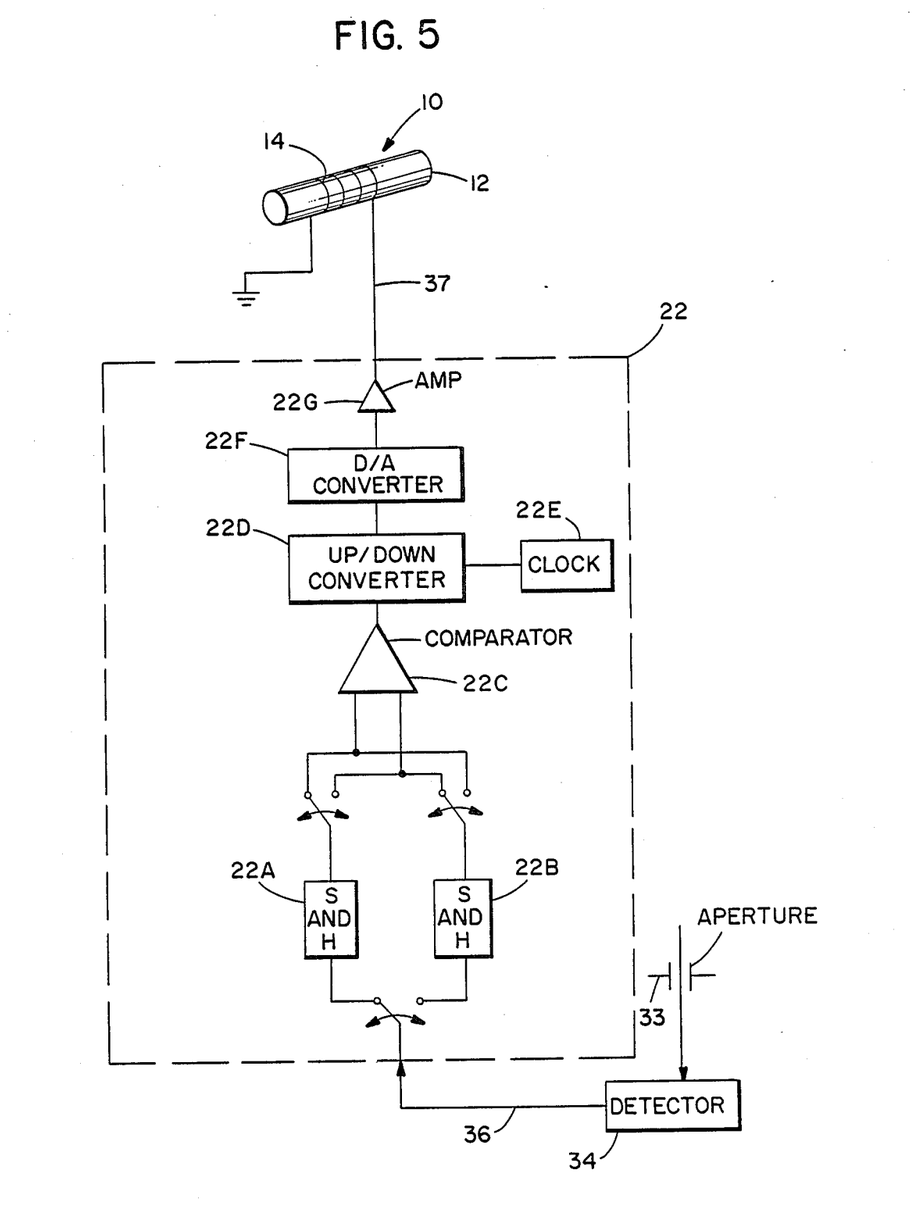
FIG. 5 is a schematic representation of the circuit detail within power supply and voltage control 22 which completes the feedback link and enables the invention to be used in a closed loop operation.

In FIG. 2, leads 20 extend to the ends of the coiled wire of the heat exchange means. These leads are connected to a power supply and voltage control 22 (See FIG. 4) which is connected in parallel to the compensator 10, which is depicted within a resonator between mirrors 26 and 28, cavity bounded by rear resonator mirror 26 and output resonator mirror 28, and laser rod 24. In the closed loop operation in which the output is sensed and power inputs are adjusted by feedback, the power supply and voltage control energizes both the excitation means (not shown) of the laser rod 24 and the heat exchange means 14 in a fashion which is prearranged to heat the body of optical material by an amount proportional to the stimulation experienced by the laser rod. Beamsplitting calibration mirror 30, lens 32, aperture 33, and detector 34 represent calibration means which is employed to sense the corrected laser beam output after it has been acted upon by the variable lens and birefringence compensator. A beam-splitting calibration mirror 30 directs part of the main beam 31 through lens 32 which focuses a portion of the compensated laser output through aperture 33 onto detector 34. This detector may be selected from a large group of commercially available radiation detectors which are sensitive to radiation produced by the laser rod 24. A typical example is the SGD-100A silicon diffused photodiode which responds to radiation from 0.5 $\mu$m to 1.1 $\mu$m and which is available from EG&G Company in Salem, Mass. Such a detector produces an output which is proportional to the energy impinging upon its surface. The radiation sensed by detector 34 is fed to power supply and voltage control 22 via feedback link 36. FIG. 5 is a schematic diagram which reveals the detailed microprocessor circuitry within power supply and voltage control 22. From feedback link 36, the detector signal is alternately supplied to a pair of sample and hold devices 22A and 22B. The outputs of the pair of sample and hold devices is also alternately switched on every other pulse between the two inputs of comparator 22C. The comparator output is fed to an up/down counter 22D which is regulated by a clock circuit 22E. A digital to analog converter 22F converts the digital output of the counter to an analog signal which can be amplified by power amplifier 22G and then fed to heat exchange means 14 which surrounds optical material body 12 of the compensator 10 via power coupling 37. The heat exchange means in FIG. 5 is shown as a coil, one of its several alternative embodiments, which are described in detail below.

When the laser rod is energized and emits radiation, power supply and voltage control 22 begins to provide some nominal power to variable lens and birefringence compensator 10. The sample and hold devices 22A and 22B sample the output of detector 34 at regular, predetermined intervals, such as every half second. If the output of the detector is higher than any previous sample stored by the sample and hold devices, then the comparator 22C causes the up/down counter 22D, which is regulated by clock 22E, to increase or dither its stored digital count by one step. If the output of the detector at any given cycle is lower than the previously held value, then the comparator reduces its stored count by a step. If there are three consecutive detector outputs lower than any previous value, then the clock 22E causes the up/down counter 22D to increase the count again. The size of the steps can be determined by the user of this circuitry in order to match the design of the laser. The magnitude of this retained count which issues from counter 22D is translated into an analog signal by converter 22F. The power amplifier 22G therefore supplies a regulated amount of power through coupling 37 to the heat exchange means 14 of the variable lens and birefringence compensator 10.

When undesirable beam divergence occurs in the laser output, the detector senses less radiation which, in turn, causes a higher output from the power amplifier to the heat exchange means in order to increase the lensing action of the optical material and, therefore, to reduce the divergence of the beam.

The compensation body 12 may be chosen to be cylindrical or disc-shaped. Any generally elongated rod-like configuration may be employed which would enable the designer to impose some predetermined temperature gradient in order to exploit or alter the optical properties of the compensator. A rod-like structure having an elliptical cross-section, for example, might be utilized to accomplish some task of optical correction if the circumstances required such a variation on the central innovative concept which comprises this invention. The length of the compensation body affects the maximum operation interval of the compensator. After a certain period of operation, excess heat builds up in the compensator and adversely affects its correcting power because eventually the heat transfer means and body of optical material eventually reach thermal equilibrium. In a cylindrical rod, for example, a one half inch (1.25 cm) long rod can provide compensation for roughly one and one-half minutes. A two inch (5 cm) long rod has a maximum operation interval of about eight minutes, at which time the compensator must be allowed to cool before it can be used again with the desired results. A relatively longer compensator body, however, requires less heat input per unit volume to achieve the same level of correction. The optical material must exhibit the property of a temperature dependent index of refraction in order to be effective in curing the defect of beam divergence. Similarly, if the compensator is envisioned to be used as a birefringence corrector, the optical material must expand when its temperature is elevated in order to form the appropriate stress field which remedies depolarization. These two characteristics are physically independent since the compensator need not necessarily be employed to assuage both the divergence and depolarization conditions. A material may, however, be selected which accomplishes both tasks simultaneously. Given these constraints, the designer of the compensator is at liberty to use a broad array of substances for the body of the compensator. Aside from the most likely choices of glass, plastic, or crystal, any material which displays the attributes delineated above may be selected for the task. Even a liquid or gaseous-phase compensation medium may be employed if it satisfies the design criteria explained above.

In designing the compensator body, an important criterion to consider is the thermal conductivity of the optical material selected. A minimum heat input by the heat exchange means will maximize the operation interval before the compensator must be deactivated and allowed to cool. In order to minimize the amount of heat admitted to the compensator body, it is highly desirable to select a material in which a small change in temperature will produce a large change in the temperature gradient created in the compensator. Material which has a low thermal conductivity or diffusivity prevents the infused heat from migrating to the center of the compensator body too rapidly.

The heat exchange means may be fashioned out of a coil of thin, insulated wire commonly used in transformers or inductor coils. Such wire can be wound around the compensator body and spaced in any arrangement which will supply the desired degree of heat exchange.

Figure 9:
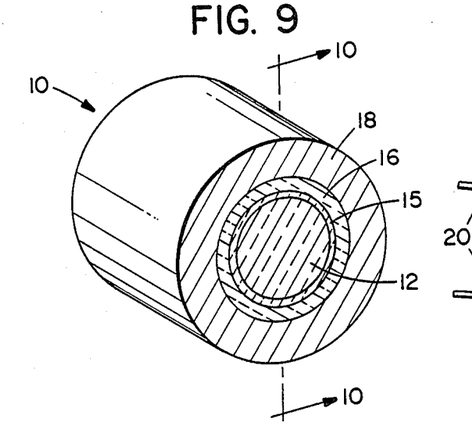
FIG. 9 is a perspective view of a further embodiment of the present invention which also reveals its cross-sectional structure, showing a layer of resistive material therein.
Figure 10:
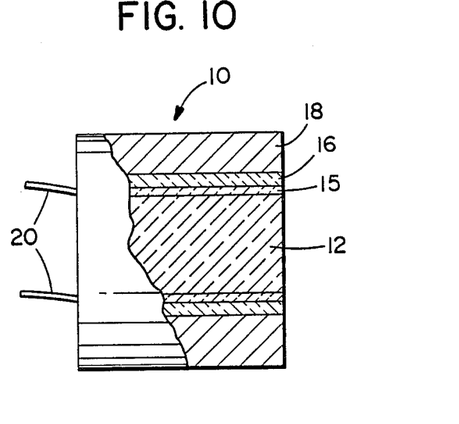
FIG. 10 is an elevational, partial cut-away view of the invention taken along line 2—2 of FIG. 9.
Figure 11:
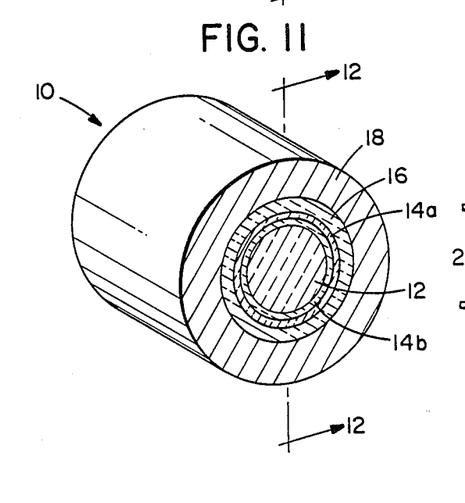
FIG. 11 is a perspective view of a further embodiment of the present invention which also reveals its cross-sectional structure, showing a layer of Peltier junction material.
Figure 12:
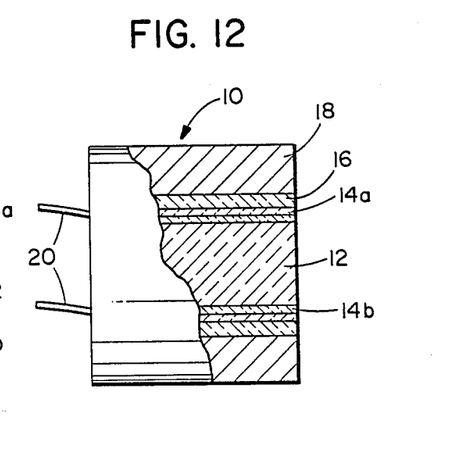
FIG. 12 is an elevational, partial cut-away view of the invention taken along line 2—2 of FIG. 11.

An alternative embodiment of the heat transfer mechanism would consist of a layer of resistive material 15 deposited directly upon the compensator body (FIGS. 9, 10). Such an enclosure or covering would be coupled to electrodes at its ends in order to pass an electrical current through it. Such material may generate heat when an electrical current is passed through it or may cool when energized, such as a Peltier junction material 14a and 14b, as shown in FIGS. 11 and 12. A further variation upon the inventive concept of the heat transfer means could be to use an external source of radiation, acoustic vibration, or heat exchange via an ambient medium of different temperature to accomplish the same goal of imposing an adjustable, substantially radial thermal gradient across and throughout the compensator body.

The invention may be constructed using a commonly available disc of optical material known commercially as a BK-7. This disc is approximately 0.4 inches (1 cm) in diameter and extends about 0.3 inches (0.8 cm) from end to end. The BK-7 disc is wrapped with a standard version of insulated transformer wire. Electric current passed through the wire to heat the periphery of the disc imposes a quadratic temperature distribution within the disc which effectively forms a spherical lens having optical power proportional to the amount of heat dissipated at its exterior. The heat diffuses inwards gradually as the periphery of the lens continues to increase temperature. Once the body of optical material reaches thermal equilibrium with the heat transfer means, the compensator is rendered ineffective and must be deactivated and allowed to cool. The BK-7, for example, sustains a constant optical power level for approximately 1.25 minutes for a constant level of input power. Increasing the input power as the optical power begins to taper off can extend the operation period, but the greater the input heat that is used per unit volume of compensation body, the shorter the duration of the lensing action since thermal equilibrium is attained more quickly.

The invention may be tested using a Zygo interferometer. The lens formed behaves like a spherical lens free of wedge. In addition, this preferred embodiment can be placed within a resonator operating over a range of 10 to 20 to pulses per second. The invention corrects for rod lensing at all repetition rates and thereby maintains excellent beam divergence. Experimental testing, which employs a laser rod and a compensator placed between crossed polarizers, yields results which indicate that the compensator reduces depolarization substantially.

Figure 6:
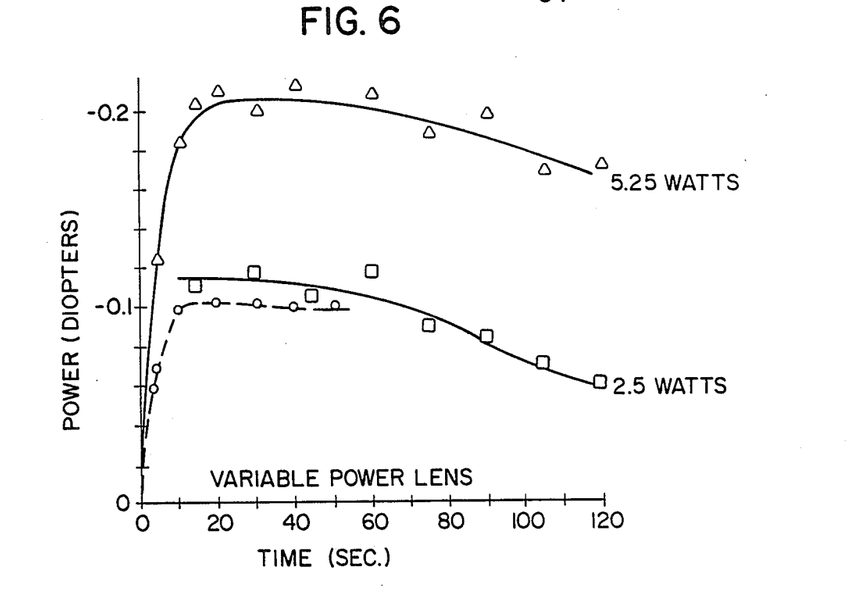
FIG. 6 is a linear plot of the optical power of the dynamic lens as a function of operation time.
Figure 7:
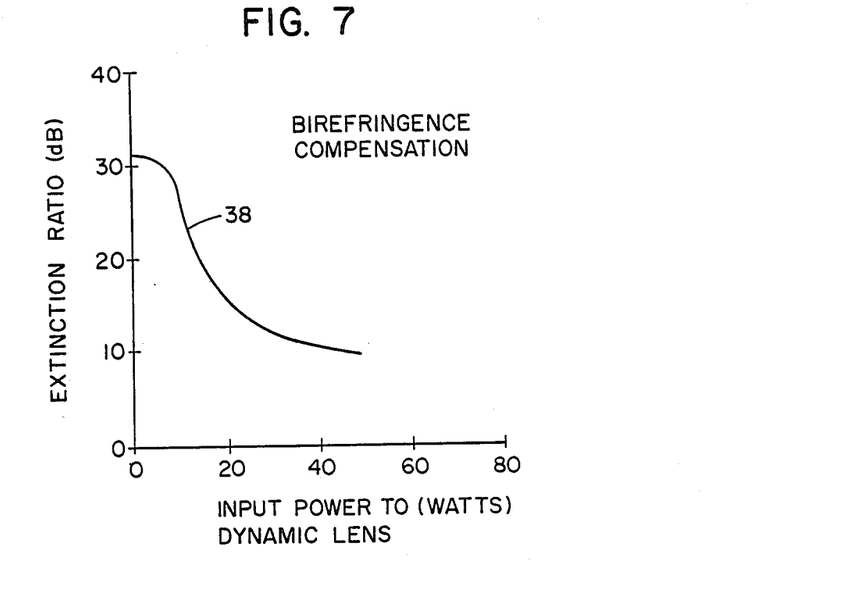
FIG. 7 is a graph showing the effectiveness of the present invention as a compensator of birefringent depolarization.
Figure 8:
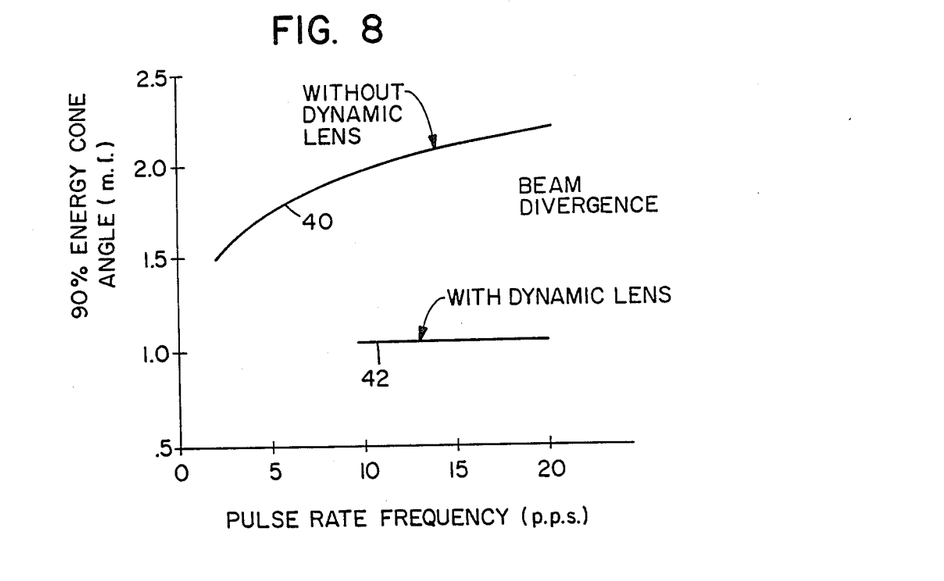
FIG. 8 is a graph which compares the utility of a solid state laser with and without the benefit of the present invention by revealing the improvement in the concentration of the output beam when the invention is employed.

Actual experimental data attesting to the effectiveness of the invention is presented in FIG. 6. Lens power in diopters is represented as a function of operating time of the compensator in seconds. FIG. 7 is a graph 38 illustrating the efficacy of the compensator in its birefringent depolarization correction mode. Graph 38 shows the degree of birefringent behavior exhibited by the compensator for a given input power in watts. The extinction ratio measured on the ordinate is a quantity measured in dB which indicates the degree of diminition of intensity of radiation which is initially linearly polarized in a given direction, passed through a depolarizer, and then measured by a device which is sensitive only to components which are perpendicular to the initial polarization direction. FIG. 8 is a graphic depiction of the compensator's ability to correct for the aberration of beam divergence. The graph compares beam divergence for a solid state rod laser with and without the dynamic lensing action of the present invention. The divergence is quantified by measuring the angle of deviation from the optical axis of the laser beam which, if rotated about that axis, would define a cone which encloses 90% of the beam's energy. A relatively smaller angle of deviation, which is marked out in milliradians on the y-axis, indicates a tighter, less divergent, and more desirable laser beam output. The 90% energy cone angle is plotted against a wide range of laser pulses (P.r.f. is an abbreviation for pulse rate frequency, measured in p.p.s., (pulses per second)). The upper curve 40 in FIG. 8 shows the 90% energy cone angle exceeding 1.5 milliradians and breaching 2.0 milliradians without the use of the dynamic lens compensator. The lower curve 42 shows results obtained with the compensator. A comparison of the two curves reveals that the use of the compensator brought about improvements ranging from $\frac{1}{3}$ to $\frac{1}{2}$ less divergence in the laser beam.

Although the present invention has been described in detail with reference to a particular preferred embodiment, persons having ordinary skill in the art will appreciate that various modifications and alterations may be made without departing from the spirit and scope of the invention.

What is claimed is:

1. Apparatus for compensating for a reduction in the power of a laser beam from a desired power, the reduction in power resulting from a divergence of the output beam due to a nonhomogeneous index of refraction in the rod induced by an outwardly directed nonlinear thermal gradient within the rod, the reduction in power of the output beam further resulting from a depolarization of the output beam due to birefringence of the rod induced by nonhomogeneous thermal expansion of the rod, said apparatus comprising:

a body of optical material disposed in optical alignment with the rod such that the output beam passes therethrough, said body having a predetermined temperature related index of refraction and a predetermined temperature related coefficient of thermal expansion;

heat transfer means thermally coupled to a periphery of said body;

heat transfer control means coupled to said heat transfer means for controlling the operation of said heat transfer means;

beam power detection means disposed to detect the power of the output beam at a point after the beam passes through said body, said detection means having a detection means output signal the magnitude of which is a function of the detected beam power, the detection means output signal being operatively coupled to said heat transfer control means for causing said heat transfer means to generate an inwardly directed nonlinear thermal gradient within said body whereby the output beam is maintained at the desired beam power; and wherein said beam power detection means further comprises:

means for splitting the beam, said splitter means reflecting a portion of the beam out of the beam;

means for measuring the power of the reflected portion of the beam, said measuring means having an output signal the magnitude of which is proportional to the beam power of the reflected portion;

means for sampling the measuring means output signal at desired intervals to obtain a sample thereof at each of said intervals;

means for storing at least one of said samples for at least the desired interval;

means for comparing the stored sample to a current sample to determine a difference therebetween;

means for varying said detection means output signal in response to the determined difference and wherein said means for measuring comprises a photodiode having a photodiode output signal having a magnitude expressive of the beam power of the reflected portion;

said means for storing comprises a first and a second sample and hold device each of which has an input operable for being alternately switchably coupled to said photodiode output signal;

said means for comparing comprises a comparator circuit having a first input coupled to an output of said first sample and hold device, a second input coupled to an output of said second sample and hold device, and an output having an output state expressive of a difference in magnitude between said outputs of said first and said second sample and hold devices; and said means for varying comprises an up-down counter having a control input coupled to said comparator circuit output and an input coupled to an output of a frequency source, the state of the comparator circuit output being operable for causing said counter to count said frequency output in an incrementing or a decrementing manner, said count being expressed in a digital format, said means for varying further comprising a digital-to-analog converter having an input coupled to said counter output, said converter having an analog output signal having a magnitude which varies in response to said counter output.

* * * * *